US008061866B2

(12) United States Patent
Torre Sarmiento et al.

(10) Patent No.: US 8,061,866 B2
(45) Date of Patent: Nov. 22, 2011

(54) AUTOMATIC MOBILE LUMINOUS DEVICE

(75) Inventors: Luis Carlos Torre Sarmiento, Pontevedra (ES); Julio César Gonzalez Alvarez, Pontevedra (ES)

(73) Assignee: Torre & Torre Innovacion, S.L., Vigo (Pontevedra) (ES)

( * ) Notice: Subject to any disclaimer, the term of this patent is extended or adjusted under 35 U.S.C. 154(b) by 576 days.

(21) Appl. No.: 11/922,985

(22) PCT Filed: Jun. 8, 2006

(86) PCT No.: PCT/ES2006/000336
§ 371 (c)(1),
(2), (4) Date: Feb. 25, 2009

(87) PCT Pub. No.: WO2007/000481
PCT Pub. Date: Jan. 4, 2007

(65) Prior Publication Data
US 2009/0303701 A1    Dec. 10, 2009

(30) Foreign Application Priority Data

Jun. 28, 2005 (ES) ................. 200501534 U

(51) Int. Cl.
*F21L 4/00* (2006.01)
*F21L 13/00* (2006.01)
*F21L 4/04* (2006.01)
*F21V 21/00* (2006.01)

(52) U.S. Cl. .................. 362/183; 362/398; 362/205
(58) Field of Classification Search .............. 362/183, 362/398, 205
See application file for complete search history.

(56) References Cited

U.S. PATENT DOCUMENTS

| 5,558,429 | A  | * | 9/1996  | Cain ............................. 362/155 |
| 5,633,623 | A  |   | 5/1997  | Campman |
| 5,685,631 | A  | * | 11/1997 | Dobert et al. ................. 362/158 |
| 6,305,819 | B1 | * | 10/2001 | Chen ............................ 362/186 |
| 7,033,040 | B2 | * | 4/2006  | Spahr et al. .................. 362/155 |
| 7,575,347 | B1 | * | 8/2009  | Daly ............................ 362/398 |
| 2005/0122714 | A1 | * | 6/2005 | Matthews et al. ............ 362/206 |
| 2006/0193129 | A1 | * | 8/2006 | Opolka ......................... 362/205 |
| 2010/0110670 | A1 | * | 5/2010 | Werth et al. .................. 362/157 |

FOREIGN PATENT DOCUMENTS

| AU | 2003236424 A | 3/2004 |
| DE | 102 13 688 A1 | 10/2003 |
| ES | 1009398 U | 8/1989 |
| JP | 7-230705 A | 8/1995 |

* cited by examiner

*Primary Examiner* — James Lee
*Assistant Examiner* — David Makiya
(74) *Attorney, Agent, or Firm* — Arent Fox LLP

(57) ABSTRACT

An automatic luminous device whose use does not require an external manual switch, which is substituted by another internal automatic switch, which activates the device only when it is placed on a sufficiently dense metal surface, nor does it require a connecting cable to an external power source, which is replaced by a preferably rechargeable battery. It was designed as an emergency light for police vehicles, and as a back-up light and is fitted with a base or casing (1) and a translucent shade (2), which, when coupled together, form a single body. Externally, the base of the casing (1) is fitted with two or more permanent magnets (3) in order to block the said casing (1), when it is placed on a sufficiently dense metal platform (4). Internally, the said casing (1) is fitted with an automatic trigger switch (5), which is solidly connected to a connector (6) by means of a flange (16) which is in turn solidly attached to a pin (7); the said connector (6) is in turn solidly attached by means of conventional wiring to a rechargeable battery (8), an external back-up connector (9), and the charge (10), perfectly insulated from the rest of the elements making up the device by means of any kind of separating element.

8 Claims, 2 Drawing Sheets

AUTOMATIC MOBILE LUMINOUS DEVICE

CROSS-REFERENCE TO RELATED APPLICATION

This application is a National Stage entry of International Application No. PCT/ES2006/000336, filed Jun. 8, 2006, the entire specification claims and drawings of which are incorporated herewith by reference.

PURPOSE OF THE INVENTION

As its name indicates, it is a luminous device which, having all the elements necessary for its proper working, it is novel in that an external manual switch is not required for it to operate. The said switch is replaced by an internal automatic one, which implies that the device only switches on when resting on a sufficiently dense metal surface. In addition, there is no need for the use of a connecting cable to an external power supply as this is replaced by a battery, preferably rechargeable.

The device is conceived as an emergency light for police vehicles, and a back-up light in the event of possible breakdowns, accidents and any other emergency situation calling for the use of a device of this kind, without the typical inconveniences of this type of device, related to the use of cables and manual switches.

BACKGROUND TO THE INVENTION

The use of mobile luminous devices by different police forces and public services in general is widely known in the state of the technique. Mobile luminous emergency devices do exist, some in the shape of a jumper wire with several lights or elements, and others fitted with just one light. Some have a fixed source of light, to which a rotating reflecting shade is added, and others work with flares produced by a stroboscopic lamp, or flash. However, all the devices share a common characteristic, and that is they all need to be connected by cable to an external power supply; in addition, in all cases, they require a manual switch for their activation, or the actual connection plug acts as a switch.

Mobile devices are normally designed for providing a camouflaged police vehicle with an element which is indispensable for revealing its presence and being seen by other drivers. Similarly, certain machines, cranes, or industrial vehicles use this type of device in special circumstances, normally to alert users to the presence of elements or obstacles on the road, as a safety complement to the workers themselves.

In the case of the police vehicles, the mobile luminous device must be preferably placed on the left side of the roof of the vehicle, as this allows the emergency vehicle to be clearly seen by the drivers in front of them. The fact that these devices need to be connected to a power supply, in this case, the housing of the car lighter, implies that the cable must pass in front of the driver's arms, objectively hindering the movements of the same, distracting the attention that should be focussed on driving, at moments when he or she should be paying the greatest attention. Another of the drawbacks of these devices is that the vehicle's occupant must take care to ensure that the device does not become disconnected from the power supply due to the sudden swinging movement of the vehicle as a consequence of potholes or bends, or the accidental rubbing of the driver's arms against the connecting cable. Moreover, the fact that a cable passes through the car's interior implies that the window must remain open, resulting in noises and vibrations that impede communication between the driver and occupant, and with other colleagues via the intercommunicator. These inconveniences are further aggravated when the driver of the car must leave the vehicle, as the connecting cable will always hinder his movements for opening the door, possibly causing bodily harm or even accidentally leading to the destruction of the device.

Another of the inconveniences of these devices is the room they take up in the vehicle, as the aim is to conceal a device that reveals the use to which the vehicle is put, and which is normally made up of a large-sized casing, and its wiring, which is usually quite long and difficult to roll up.

There are no known wireless mobile luminous devices or such that are activated automatically.

DESCRIPTION OF THE INVENTION

The device which is the object of the present invention offers important developments with respect to the devices currently in use, as, on the one hand, they definitively eliminate the use of a connecting cable to a power supply and all the problems deriving from the same, and, on the other, they start operating by means of an automatically activated switch only when they are placed on a suitable surface, in this case, a metal one, automatically deactivating when removed from the same.

The device is made up of a casing fitted with several magnets, combined or not with back-up suction pads, for fixing the device to a metal base. An automatic connection and disconnection switch is internally incorporated in the base. This switch is made up of a cylinder containing a third magnet which runs vertically like a piston, equipped with an axle, and fastened to an internal base by a coil spring, which allows limited movement of the said magnet when it is placed near a sufficiently dense metal surface. Either on its upper end or on its side, the cylinder has the necessary terminals or elements to close an electrical circuit when the magnet is activated by the force of attraction towards the aforementioned metal surface, giving way to the current of the power supply source, in this case, a rechargeable battery inside the casing itself, triggering the charge, made up of an electric rotor combined with a light and a reflective shade, or of either a strobe-like or flash-like source of light.

The device likewise includes a suitable external connector, by means of which, with the aid of a back-up cable fitted with a charger, it can be powered via the corresponding external electric energy supply, in order to guarantee the working of the device in the event of discharge of its internal battery and to recharge the same when it is flat.

Some drawings are provided to help understand the proposed device.

DESCRIPTION OF A PREFERRED EMBODIMENT

Figure 1:
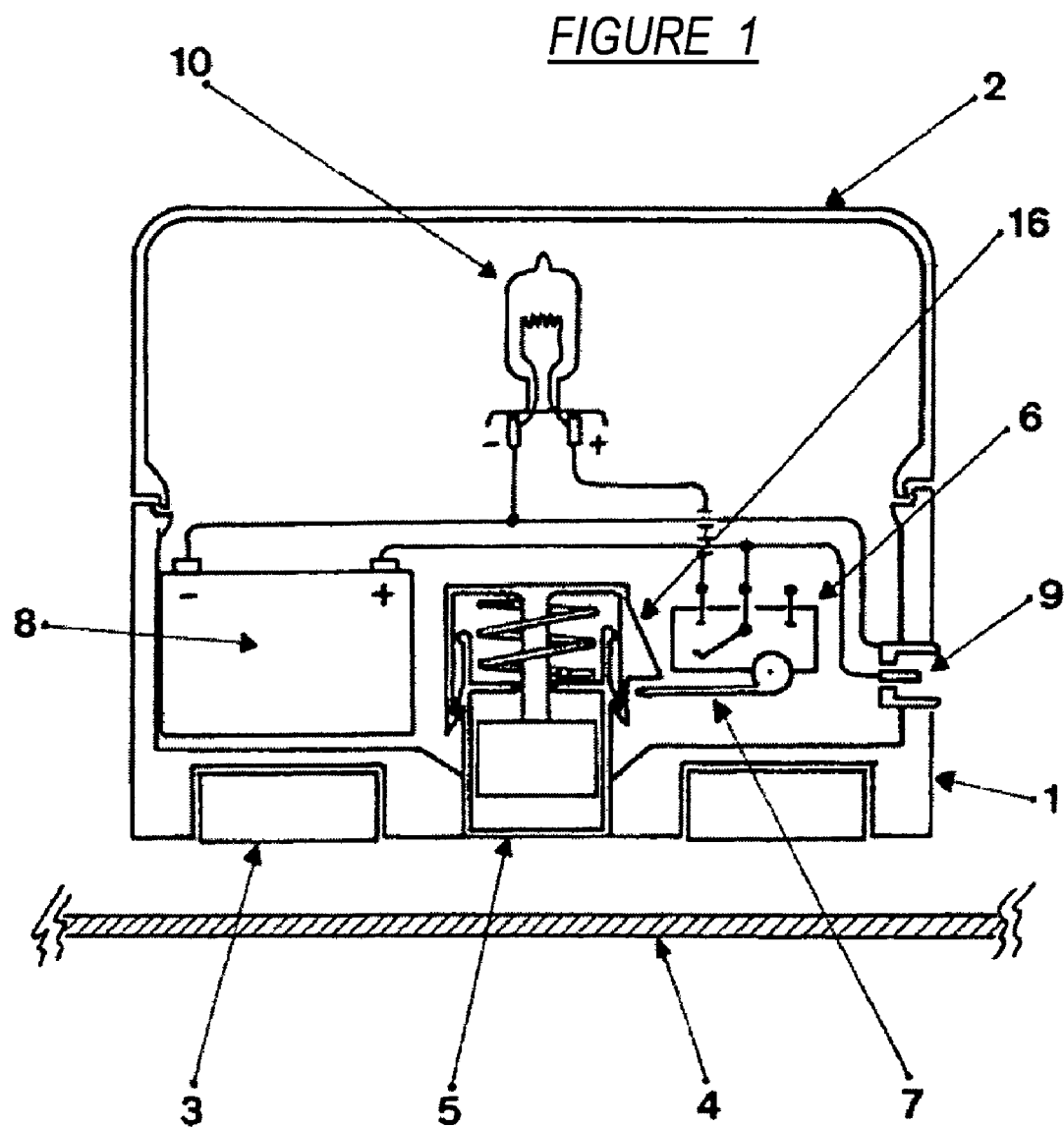
FIG. 1.—Section drawing of the device, in which the different parts that compose it can be appreciated.
Figure 2:
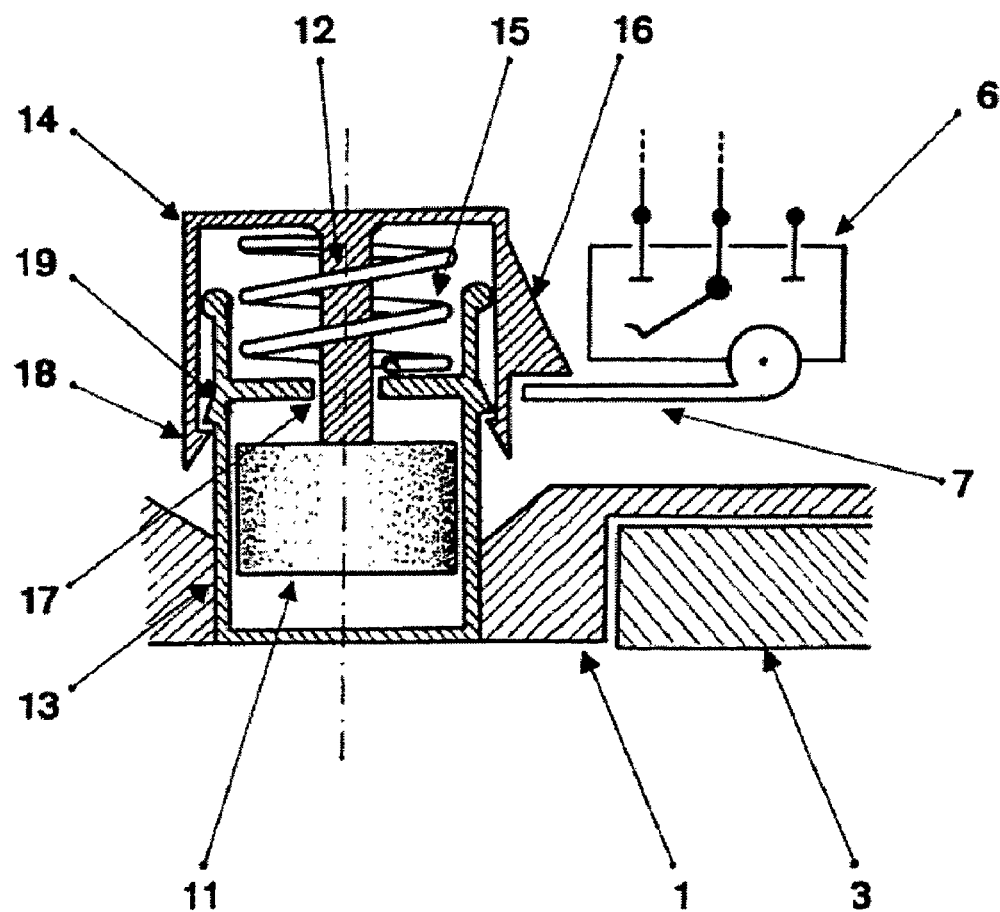
FIG. 2.—Enlarged section drawing of the automatic activation switch, in which the different elements that compose it can be appreciated.

The said figures illustrate how the AUTOMATIC MOBILE LUMINOUS DEVICE, which is the object of the present invention, is made from a casing (1), to which a translucent screen is fastened by means of a thread or screws (2). The base of the casing (1) is fitted on the outside with several anchoring magnets (3), to keep the said casing in place when it is laid on a sufficiently dense metal platform (4). The said casing (1) is fitted on its inside, preferably in its centre of gravity, with an automatically activated switch (5), a conventional connector (6) fitted with an activation pin (7), a rechargeable battery (8), and an external back-up connector (9), apart from the charge (10), which can be an element combining rotation and light, or simply a strobe-type luminous one; all of which is interconnected with the corresponding wiring, making sure that the charge (10) is perfectly insulated from the rest of the mechanisms that make up the device.

The automatic activation switch (5) is made up of a cylinder (13) in the shape of an inverted cup, inside which is a cylindrical permanent magnet (11) acting as a piston, fitted with an axle (12) that emerges from the centre of gravity in the flat upper side, crosses a hollow undercut (17) created for the purpose on the base of the cylinder (13), and ends up welded to an inverted cylindrical cup (14), that externally envelops the cylinder (13). The said cylindrical cup (14) is fitted with a flange (16) which is solidly connected to the pin (7) of the conventional connector (6). A coil spring is placed (15) between both cylinders (13) (14), in order to keep the permanent magnet (11) raised, when sufficient force of attraction is not exerted on the head of the said permanent magnet (11). The tolerance limit of the permanent magnet (11), the axle (12), the undercut (17), and the cylinders (13) (14) is enough to ensure, all the parts being coupled together, the free swaying movement of the unit made up by the permanent magnet (11), axle (12) and cylinder (14). Nevertheless, the said movement is limited by the existence of several stops (18) (19), solidly connected to each other, emerging from the external cavity of the cylinder (13) and the internal cavity of the cylinder (14).

Consequently, the device works as follows: when the device manually couples by means of its casing (1) with a sufficiently dense metal platform (4), the former is fastened to the said surface by means of its magnets (3); in a parallel fashion, this gives rise to the automatic movement of the permanent magnet (11) which, overcoming the resistance of the coil spring (15), with its downward movement, will drag the external cylinder (14), thus activating the connector (6) as a result of the thrust of the flange (11), causing the electrical circuit to close, and, consequently, activating the charge (10), then powered by the battery (8). When the device is removed from the metal platform (4), the permanent magnet (11) will be freed from the attraction energy of the said metal platform (4), the opposite movement being caused by the coil spring (15), until the stops (18) (19) restrict its rise. In the course of the vertical upward movement, the connector (6) will be disconnected, thus opening the electrical circuit, deactivating the powering of the charge (10), and, as a result, the device will be disconnected.

The device is likewise fitted with an external back-up connector (9) for recharging the battery (8) when the latter no longer has enough energy to activate the charge (10), it being possible for the said charge to be made irrespective of whether the device is activated or deactivated, to allow the powering of the charge (10) when the use of the back-up cable is indispensable as a consequence of the lack of energy in the battery (8).

The invention claimed is:

1. An automatic mobile luminous device, comprising:
    a casing and a translucent screen joined together to form a single element;
    at least one permanent anchoring magnet fitted with the casing that blocks and stabilises the casing when the casing is placed on a metal platform; and
    an automatic activation switch fitted with the casing, which is solidly attached to a connector by means of a flange which is attached to a pin,
    wherein the connector is attached, by means of wiring, to a rechargeable battery, to an external back-up connector, and to a charge, and insulated by means of a separating element,
    wherein the automatic activation switch is fitted with a cylindrically shaped permanent magnet housed inside a cylindrical cavity, the cylindrically shaped permanent magnet is fitted with an axle which crosses the cylindrical cavity to form an integral element with a cylindrical cup,
    wherein the cylindrically shaped permanent magnet, the axle, and the cylindrical cup form a single mobile unit,
    wherein a coil spring is disposed between the cylindrical cup and a base of the cylindrical cavity, to keep the single mobile unit raised when the casing is not resting on the metal platform,
    wherein the flange on a side of the cylindrical cup is solidly connected to the end of the pin that activates and deactivates the connector to produce activation of the charge when the casing is resting on the metal platform, the charge being powered by energy coming from the rechargeable battery placed inside the casing,
    wherein movement of the cylindrically shaped permanent magnet, the axle, the cylindrical cup, and the flange is limited by stops arranged between facing superficies of the cylindrical cavity and the cylindrical cup, and
    wherein the external connector is configured to power the charge and recharge the rechargeable battery by means of a back-up charger connected to an external power source, when the rechargeable battery lacks power.

2. The automatic mobile luminous device according to claim 1, wherein the axle emerges vertically from its centre of gravity and crosses the cylindrical cavity through an undercut to become an integral part of a cylindrical cup.

3. The automatic mobile luminous device according to claim 1, wherein the cylindrical cup, flange and stops are removable, and wherein movement of the cylindrically shaped permanent magnet is limited by contacting the cylindrically shaped permanent magnet with an upper limit of the cylindrical cavity.

4. The automatic mobile luminous device according to claim 1, wherein the back-up charger is coupled by wiring between the external power source and the external connector driven into the casing.

5. The automatic mobile luminous device according to claim 1, wherein that the charge comprises a fixed-light lamp, optionally combined or not with a rotor and reflective elements, or comprises a stroboscopic-type lamp.

6. The automatic mobile luminous device according to claim 1, wherein that the connector is coupleable with the rechargeable battery, with the external back-up connector and with the charge, by means of a charging instrument connected by wire between an external power source and the external back-up connector, and wherein the charge is powered at the same time the battery is being recharged while the casing is resting on the metal platform, and wherein only the battery is recharged when the casing is not resting on a metal platform.

7. The automatic mobile luminous device according to claim 1, further comprising suction pads, wherein the at least one permanent anchoring magnet is combinable with the suction pads such that the casing is laterally immobile on the metal platform.

8. An automatic mobile luminous device, comprising:
a casing and a translucent screen joined together to form a single element;
at least one permanent anchoring magnet fitted with the casing that blocks and stabilises the casing when the casing is placed on a metal platform; and
an automatic activation switch fitted with the casing which is attached to a connecting instrument,
wherein the connector is by means of wiring, to a rechargeable battery to an external back-up connector and to a charge, and insulated by means of separating element,
wherein the automatic activation switch is fitted with a cylindrically shaped permanent magnet housed inside a cylindrical cavity, the cylindrically shaped permanent magnet is fitted with an axle which crosses the cylindrical cavity to form an integral element with a cylindrical cup,
wherein the cylindrically shaped permanent magnet, the axle, and the cylindrical cup form a single mobile unit,
wherein a coil spring is disposed between the cylindrical cup and a base of the cylindrical cavity, to keep the single mobile unit raised when the casing is not resting on the metal platform,
wherein the connecting instrument produces activation of the charge when the casing is resting on the metal platform, the charge being powered by energy coming from the rechargeable battery placed inside the casing,
wherein movement of the cylindrically shaped permanent magnet, the axle, the cylindrical cup, and the flange is limited by stops arranged between facing superficies of the cylindrical cavity and the cylindrical cup, and
wherein the external connector is configured to power the charge and recharge the rechargeable battery by means of a back-up charger connected to an external power source, when the rechargeable battery lacks power.

* * * * *